(12) United States Patent
Duffield et al.

(10) Patent No.: US 8,813,113 B1
(45) Date of Patent: Aug. 19, 2014

(54) METHOD AND SYSTEM FOR ADDING A CONDITIONAL ACCESS SYSTEM

(75) Inventors: David Jay Duffield, Indianapolis, IN (US); Jean-Louis Yves Diascorn, Carmel, IN (US); Ahmet Mursit Eskicioglu, Statin Island, NY (US)

(73) Assignee: Thomson Licensing, Issy-les-Moulineaux (FR)

( * ) Notice: Subject to any disclaimer, the term of this patent is extended or adjusted under 35 U.S.C. 154(b) by 4212 days.

(21) Appl. No.: 10/129,049

(22) PCT Filed: Nov. 2, 2000

(86) PCT No.: PCT/US00/30215
§ 371 (c)(1),
(2), (4) Date: Apr. 30, 2002

Related U.S. Application Data

(60) Provisional application No. 60/163,024, filed on Nov. 2, 1999.

(51) Int. Cl.
*H04N 7/16* (2011.01)

(52) U.S. Cl.
USPC .......... 725/25; 725/27; 725/28; 725/29; 725/30; 725/31; 726/2; 726/9; 726/13; 726/20; 726/21; 726/26; 726/27; 726/33; 380/201; 380/202

(58) Field of Classification Search
USPC ........ 725/25, 27, 28, 29, 30, 31; 726/2, 9, 13, 726/20, 21, 22, 26, 27, 33; 380/201, 202
See application file for complete search history.

(56) References Cited

U.S. PATENT DOCUMENTS

| | | | |
|---|---|---|---|
| 5,420,866 A | 5/1995 | Wasilewski | 370/110.1 |
| 5,600,573 A * | 2/1997 | Hendricks et al. | 725/109 |
| 5,920,626 A * | 7/1999 | Durden et al. | 380/210 |
| 6,157,719 A * | 12/2000 | Wasilewski et al. | 380/210 |
| 6,381,747 B1 * | 4/2002 | Wonfor et al. | 725/104 |

FOREIGN PATENT DOCUMENTS

WO 99/22372 5/1999 .......... G11B 20/00

* cited by examiner

*Primary Examiner* — Pankaj Kumar
*Assistant Examiner* — Charles N Hicks
(74) *Attorney, Agent, or Firm* — Robert D. Shedd; Paul P. Kiel

(57) ABSTRACT

A method for adding a conditional access system to a digital audio/video transmission system that delivers content from a source to a security device associated with an audio/video processing device by providing at the broadcast source a datastream having system information data including an unused identifier reserved for security data associated with the additional conditional access system.

10 Claims, 4 Drawing Sheets

| PID | DESCRIPTION | PACKETS PER 1000 INCOMING | | PACKETS PER 1000 OUTGOING |
|---|---|---|---|---|
| 000 | PAT 230 | 5 | NOT A PMT ENTRY. POINTS TO THE PMT FOR THIS SERVICE AT PID # 100. (ALSO POINTS TO ANY OTHER SERVICES ON THIS PHYSICAL CHANNEL.) | 5 |
| 100 | PMT 207 | 5 | NOT A PMT ENTRY. THIS PID CONTAINS THE PMT PACKETS | 5 |
| | | | | |
| 101 | VIDEO | 850 | NO CHANGES | 850 |
| 102 | AUDIO | 110 | NO CHANGES | 110 |
| 110 | NDS CA ECMs | 10 | NO CHANGES | 10 |
| 111 | IRDETO CA ECMs | 10 | PACKETS ARE REMOVED AND REPLACED WITH XCA LECMs ON PID 120 | 0 |
| 112 | NAGRA CA ECMs | 10 | NO CHANGES | 10 |
| 120 | XCA CP ECMs | 0 | PACKETS ARE INSERTED WHERE CA PACKETS WERE REMOVED | 10 |
| 121 | CMPS CP ECMs | 0 | NO CHANGES | 0 |
| | | | | |
| | | | | |

FIG. 4

METHOD AND SYSTEM FOR ADDING A CONDITIONAL ACCESS SYSTEM

This application claims the benefit under 35 U.S.C. §365 of International Application PCT/US00/30215 filed Nov. 2, 2000, which was published in accordance with PCT Article 21(2) on May 10, 2001 in English; and which claims benefit of U.S. provisional application Ser. No. 60/163,024 filed Nov. 2, 1999.

FIELD OF THE INVENTION

The present invention relates generally to digital audio/video transmission systems, and more particularly to a method which allows the addition of a conditional access system in a digital audio/video transmission system without downstream modification of system information tables in MPEG data.

BACKGROUND OF THE INVENTION

ISO/IEC 13818-1 (Information Technology-Generic Coding of moving pictures and associated audio information systems) is an international standard that specifies the coding of one or more elementary streams of audio and video as well as other data into single or multiple streams suitable for storage and transmission. A transport stream (TS) combines one or more programs with one or more independent time bases into a single stream. TS packets are 188 bytes in length. Each TS packet has a 4-byte header with a packet ID (PID) that identifies the type of data contained in the packet. In addition to A/V packets, a TS contains system information tables to demultiplex and present programs. A Program Map Table (PMT) is a table that provides the mappings between the program numbers and the elements that comprise them. It includes a list of PIDs associated with each program.

The Advanced Television Systems Committee (ATSC) has adopted the Simulcrypt architecture for its Conditional Access (CA) system for terrestrial broadcast. In this architecture, each service is transmitted with Entitlement Management Messages (EMMs) and Entitlement Control Messages (ECMs) for a number of different proprietary systems. This way, decoders using different CA systems can decode the service using a common framework for signaling the different entitlement messages. EMMs carry private CA information specifying authorization levels or services of specific decoders, whereas ECMs contain control words for descrambling authorized services. Each service is comprised of audio and video packets. Any one decoder picks out the packets it needs and ignores the others in the stream.

In a Simulcrypt based CA system, a digital audio/video processing system, such as a Digital Television (DTV), parses the PMT and extracts the service and ECM PIDs using a CA system identification (ID) obtained from the CA module. Normally, each CA module supports only one CA system, and therefore has only one CA system ID. The PIDs of the A/V packets and the PIDs of the ECMs carrying the Control Words (CWs) are sent to the CA module, which descrambles programs having proper purchase entitlements.

Extended Conditional Access (XCA) is a copy protection system for providing local protection of audio and video content during transmission and storage in digital home networks. It specifies access and presentation devices to access, convert and display protected content. Removable security devices (converter and terminal cards) are recommended for performing security related functions. In XCA, the descrambling keys are rebundled in an ECM which is protected by a unique local key. The decoder that receives content with local ECMs therefore may need to handle not only the content protected by its own particular CA system, but by XCA as well.

The National Renewable Security Standard (NRSS) provides a means for renewable security to be employed with digital consumer electronics devices such as digital television receivers and digital VCRs. The security functionality is thus separated from navigational devices. When an NRSS security device receives protected content from its host device, it descrambles it, and sends it back to the host device. This link may also need to be protected.

In an ISO/IEC 13818-1 based system, a program may be scrambled in order to provide a Pay TV service. The transport stream carries the programs, the ECMs and the PMTs. The PMT has an entry for each CA system that protects the program. Each entry contains the CA_system_id, the PIDs of the scrambled streams and the PID of the ECMs that contain the keys to descramble the program.

If the receiving device is also a transformation device which can either add an extra CA system, or replace one (for copy protection, for example, like XCA does), then this device needs to output a transport stream where the PMT has an entry for that new CA system. The receiving device may acquire each and every PMT that is present in the original transport stream, process them, add the entry for the extra CA system and then insert the modified PMTs in the output transport bitstream.

The aforementioned process can be very burdensome due in part to the limited processing power of receiving devices. Furthermore, processing complexities increase due to the fact that PMTs may span more than one transport packet. Thus, adding an entry may mean adding a packet, which in turn poses a multiplexing problem, as the bitstream may already be full or the time stamps may need to be adjusted. A method which overcomes these problems is highly desired.

SUMMARY OF INVENTION

A method for adding a conditional access system comprises providing at the broadcast source a data stream having a portion thereof reserved for insertion of security data associated with the additional conditional access system. The additional CA system is declared during the original transport stream creation at the broadcast source by adding an entry in the PMT. This entry defines a unique PID for the ECMs. The PID reserved for the extra CA system ECMs is not used in any other way, and the transport stream arriving at the receiver device will not contain any packets having the reserved PID. The present invention implements at the broadcast source sending 'dummy' entries for data streams that are not present in the CA protected broadcast, thereby minimizing the PMT processing required for each conversion of the service data. A correct PMT is thus output from the receiving device without the need to modify/update tables.

The present invention is embodied in a method of operating a security device in a conditional access system comprising receiving a datastream having system information data including an unused identifier reserved for security data associated with the additional conditional access system; and inserting into the data stream the security data associated with the additional conditional access system.

BRIEF DESCRIPTION OF THE FIGURES

FIG. 4 illustrates an exemplary embodiment of a program map table useful in carrying out the present invention.

DETAILED DESCRIPTION OF THE INVENTION

Figure 1:
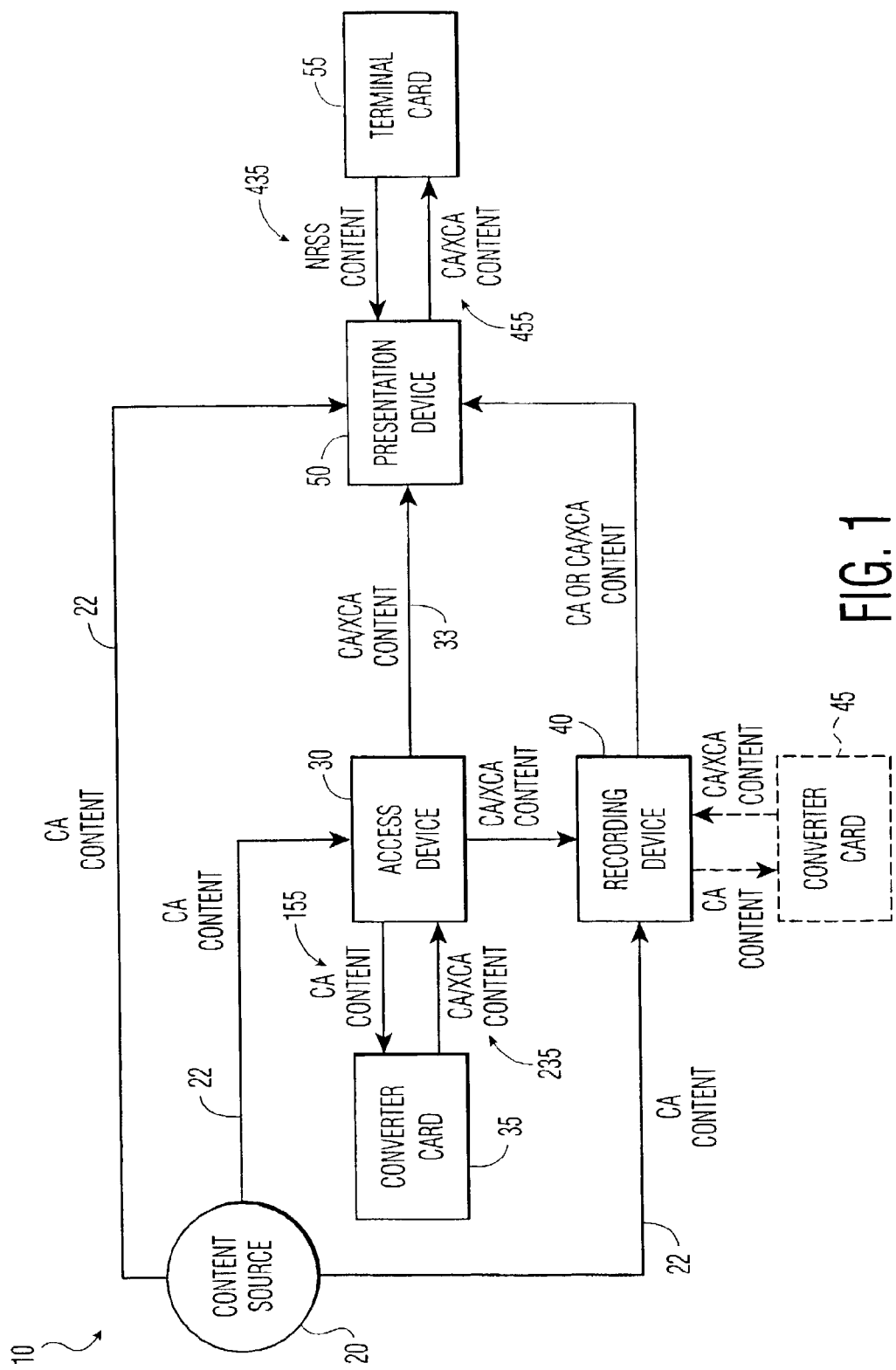
FIG. 1 illustrates an exemplary embodiment of a network adapted to receive content from a broadcasting source and provide copy protection using XCA and NRSS copy protection systems.

FIG. 1 illustrates a network 10 that receives content via a a transport stream from a broadcasting source, i.e. via content source 20, and provides protection with XCA (described herein). The content source 20 can provide content 22 of economic value, whether from tape, DVD, cable, satellite or terrestrial broadcast, for example. The content 22 typically includes A/V content, which is protected and supplied to subscribers of a private CA network. The subscribers who purchase, or are otherwise entitled to receive the content 22, are supplied with necessary keys for descrambling the content 22. According to the embodiment of FIG. 1, the content source 20 can provide this CA content 22 to an access device 30, recording device 40 and/or presentation device 50, for example.

Access device 30 can take the form of a set-top box. The access device 30 operates in conjunction with a removable security device such as an XCA/NRSS converter card 35 to create XCA protected content in CA/XCA content 33 from the CA content 22. Recording device 40 can take the form of a Digital VHS (DVHS) or DVD recorder. The recording device may or may not be provided with a removable security device such as converter card 45 analogous to the converter card 35. Presentation device 50 can take the form of a DTV, and operate in conjunction with removable security device XCA/NRSS terminal card 55 for descrambling CA/XCA protected content.

Figure 2:
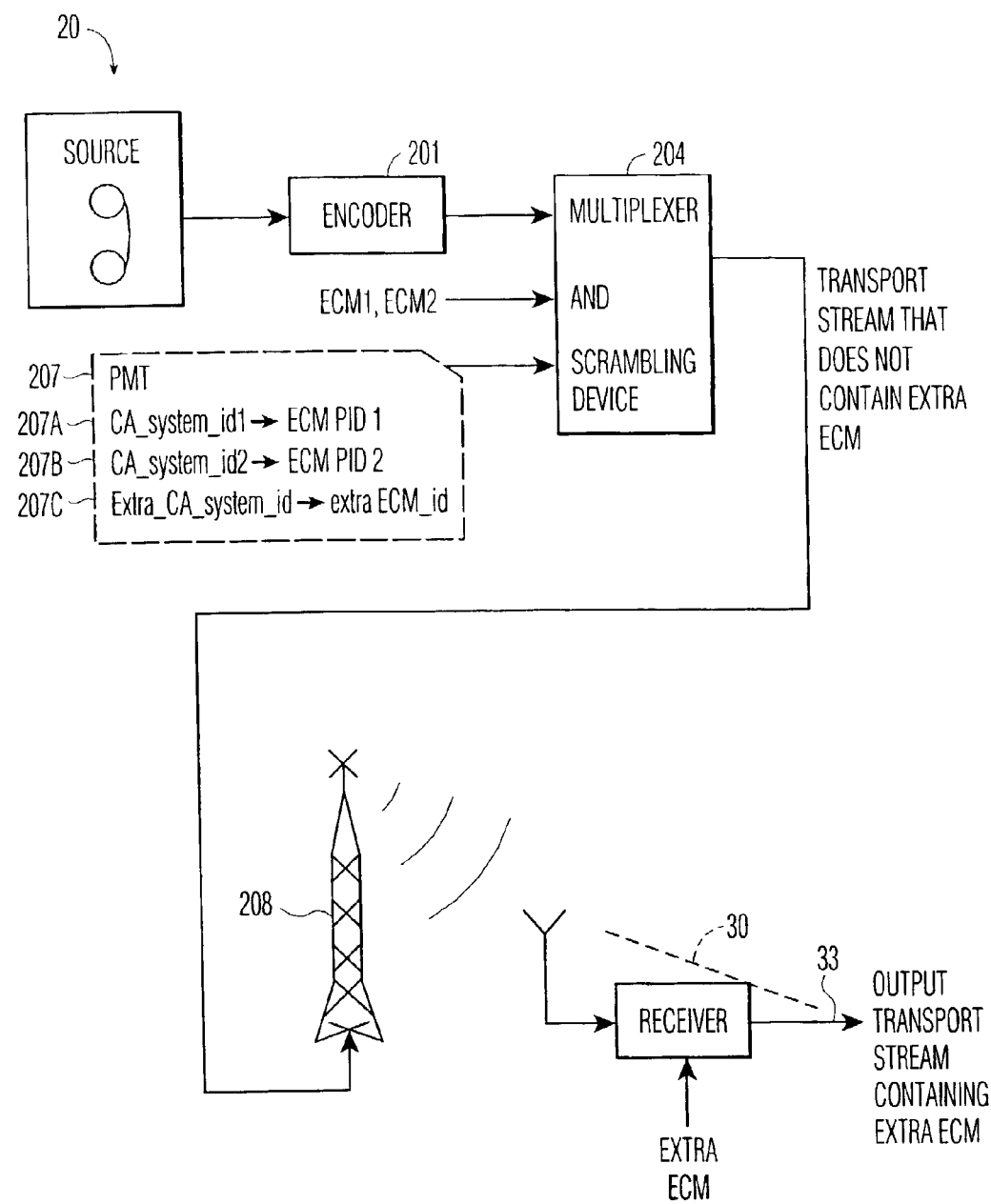
FIG. 2 illustrates a block diagram of the functional elements and processing flow associated with adding a conditional access system according to an aspect of the present invention.
Figure 3:
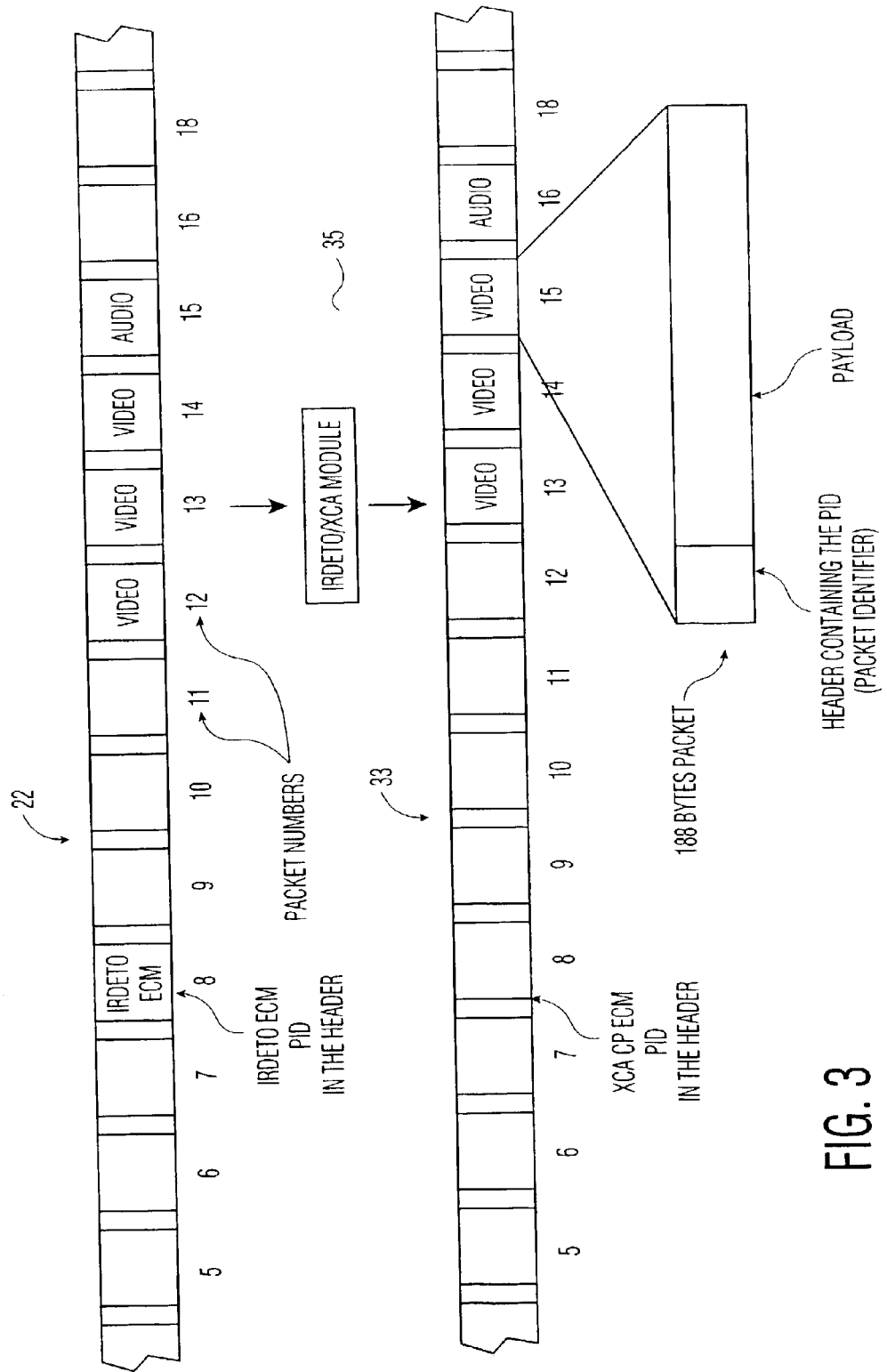
FIG. 3 illustrates a block diagram of the processing associated with conversion of content by a security device for a conditional access system according to an aspect of the present invention.

FIGS. 2-4 provide schematic illustrations of the processing associated with forming the transport stream 22 for input into an audio/video processing device 30 and associated security device 35 and subsequent output of the transport stream 33. Note that the present invention applies to ISO/IEC 13818-1 compliant data systems, including conditionally accessed digital TV systems like ATSC, DVB and ARIB (whether, Terrestrial, Satellite, Cable SMATV, or MMDS).

As shown in FIG. 2, the broadcast source 20 includes a source of content which is encoded via encoder 201 (for example, a PES encoder) and conventional multiplexer/scrambler module 204. A radiating source such as antenna 208 communicates the content to audio/video processing device (e.g. receiver) 30 and corresponding security device 35 (see FIGS. 1, 3). Program Map Table (PMT) 207 illustrated therein is associated with transport stream 22. In PMT 207, there is shown an association 207A of CA_system_id 1 with corresponding ECM PID 1, and association 207B of CA_system_id 2 with corresponding ECM PID 2. In order to add a CA system, an additional CA_system_id is declared at the broadcast site 20 via an additional table entry 207C into the PMT associating extra CA_system_id with corresponding extra_ECM_PID. The additional PID is preferably a previously unused PID reserved for the ECM of the added or extra CA system. That is, the PID is not used for transport packets before the bitstream gets transformed at the receiver. Note that the transport stream 22 shown in FIG. 2 (and FIG. 3) does not contain the extra ECMs. At the receiver 30, the PID for the ECM for the extra CA system is extracted from the PMT 207. The receiver then generates the ECMs with that PID and inserts them into the datastream to provide output datastream 33.

Referring more particularly to FIGS. 3 and 4, there is depicted an exemplary processing flow of the datastream or bitstream 22 as it would enter and exit a security device 35 such as an Irdeto/XCA CA module. The CA module converts the content to XCA using the entries provided in PMT 207.

As shown in FIG. 4, table of PID entries 400 includes an entry for the Program Association Table (PAT) 230. The PAT 230 is predefined in MPEG to be located on PID 000 (0x0000) and points to all the PMT PIDs. There is one PMT for each service. PMT 207 includes entries for all the PIDs that make up a given service (in this case video, audio, CA, and eventually, CP).

Two "dummy" entries 120, 121 exist in the PMT 207 as it is sent over the network to security device 35 (FIG. 3). The mapping determines how XCA and CMPS should provide copy protection. In the example depicted herein, it is understood that the service provider authorizes XCA and CMPS as copy protection systems. This also provides a mechanism for the interoperation of more than one cooperating CP system The two CP system PIDs 120, 121 are not used in the network broadcast data stream shown in FIG. 3 (i.e., there are no packets sent on these PIDs). When the CA module descrambles the content and converts it to a CP system, the CA ECM packets (PID 111 in FIG. 4) are removed and replaced with the CP system packets (PID 120) at the same locations in the bitstream, as illustrated in FIG. 3.

Addition of the dummy entries to the PMT 207 has the following benefits: First, the provider can ensure that there are no collisions by abstaining from sending data on the PIDs specified for CP ECM data. This way, the CA module does not have to pick a PID and run the risk of 'colliding' with another PID that the broadcaster is using. Second, if the broadcaster does not want to be program copied, he does not put the CP entries into the PMT. If the pirate wants to tape this program, he will have to edit the PMT properly in addition to all other requirements for making a recording. Note that the PMT 207 is valid both before and after the CA/CP conversion.

Note also that a recording device such as that depicted in FIG. 1 will also not have to modify any entries in the PMT. (Even in the systems where recording devices need to change CP system data flags.) The CP system control flags will be located in the CP ECM PID packets and can be modified there.

The present invention also contemplates the possibility of 'reuse' of the CA system PID for the CP system data. However, in a simulcrypt system, this makes it difficult to find the CP system ECMs. Either the PMT must be changed so that it points to the XCA ECMs properly, or a device trying to find the XCA ECMs must know which CA system initially descrambled the content. In addition, if the stream is to be ISO/IEC 13818-1 compliant, modification of the PMT may also be required.

The invention claimed is:

1. A method of facilitating the addition of a conditional access system to a digital audio/video transmission system that delivers content from a service provider-broadcast source to a downstream security device of a subscriber associated with an audio/video processing device, said method comprising:

transmitting from said service provider-broadcast source a data stream having system information data including an unused packet identifier reserved for security data associated with said additional conditional access system; and providing security data in packets associated with said unused packet identifier by said downstream security device of a subscriber.

2. The method according to claim 1, wherein said security data includes entitlement control messages.

3. The method according to claim 1, wherein said transmitting step further comprises inserting at said broadcast source at least one entry into a program map table associating said additional conditional access system with a packet identifier, said conditional access system packet identifier being associated with entitlement control messages.

4. A method of operating a security device of a subscriber device in a conditional access system comprising:

receiving a data stream, transmitted from a service provider-broadcast source, having system information data including an unused packet identifier reserved for security data associated with an additional conditional access system; and inserting, at said security device of a subscriber device, into said data stream said security data associated with said additional conditional access system.

5. The method according to claim 4, wherein said additional conditional access system comprises a copy protection system.

6. The method according to claim 4, comprising the further step of:

parsing a map table associating said unused packet identifier with said additional conditional access system to obtain said security data for insertion into said data stream.

7. The method according to claim 4, wherein said downstream security device does not update a program map table for said additional conditional access system.

8. A method for creating system information tables included in a data stream sent from a service provider-broadcast source to a downstream security device of a subscriber, which downstream security device of a subscriber adds an additional conditional access system to said data stream, said method comprising:

providing table entries in at least one of said tables having an unused packet identifier reserved for security data associated with said additional conditional access system.

9. The method according to claim 8, further comprising inserting at said downstream security device security data associated with said unused packet identifier.

10. A method for facilitating the addition of a conditional access system to a digital audio/video transmission system that delivers content from a service provider-broadcast source to a downstream security device of a subscriber associated with an audio/video processing device, said method comprising:

transmitting from said broadcast source to said downstream security device of a subscriber a data stream having a portion reserved for downstream insertion of security data.

* * * * *